No. 800,941. PATENTED OCT. 3, 1905.
A. H. RAGSDALE.
GAME APPARATUS.
APPLICATION FILED NOV. 6, 1903.

2 SHEETS—SHEET 2.

Witnesses
W. N. Woodson
J. H. Johnston

Inventor
A. H. Ragsdale.
By,
R. S. & B. Lacey, Attorneys ent it as it appears.

UNITED STATES PATENT OFFICE.

ALTON H. RAGSDALE, OF ATLANTA, GEORGIA.

GAME APPARATUS.

No. 800,941.  Specification of Letters Patent.  Patented Oct. 3, 1905.

Application filed November 6, 1903. Serial No. 180,107.

*To all whom it may concern:*

Be it known that I, ALTON H. RAGSDALE, a citizen of the United States, residing at West End, Atlanta, in the county of Fulton and State of Georgia, have invented certain new and useful Improvements in Game Apparatus, of which the following is a specification.

This invention relates to a novel card game constituted for purposes of interest and instruction. The game broadly comprises a deck of three sets of cards and a board provided with suitable indicating data to receive the cards as same are played. Specifically, the board is provided with two United States flags printed thereon, each flag comprising the usual thirteen stripes and forty-five star-spaces. Each of the star-spaces is designated by consecutively-disposed numerals and is adapted to receive a card out of the deck, which card is also provided with indicia corresponding to that by which the spaces are designated to thereby indicate the position of the card when played to the board.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
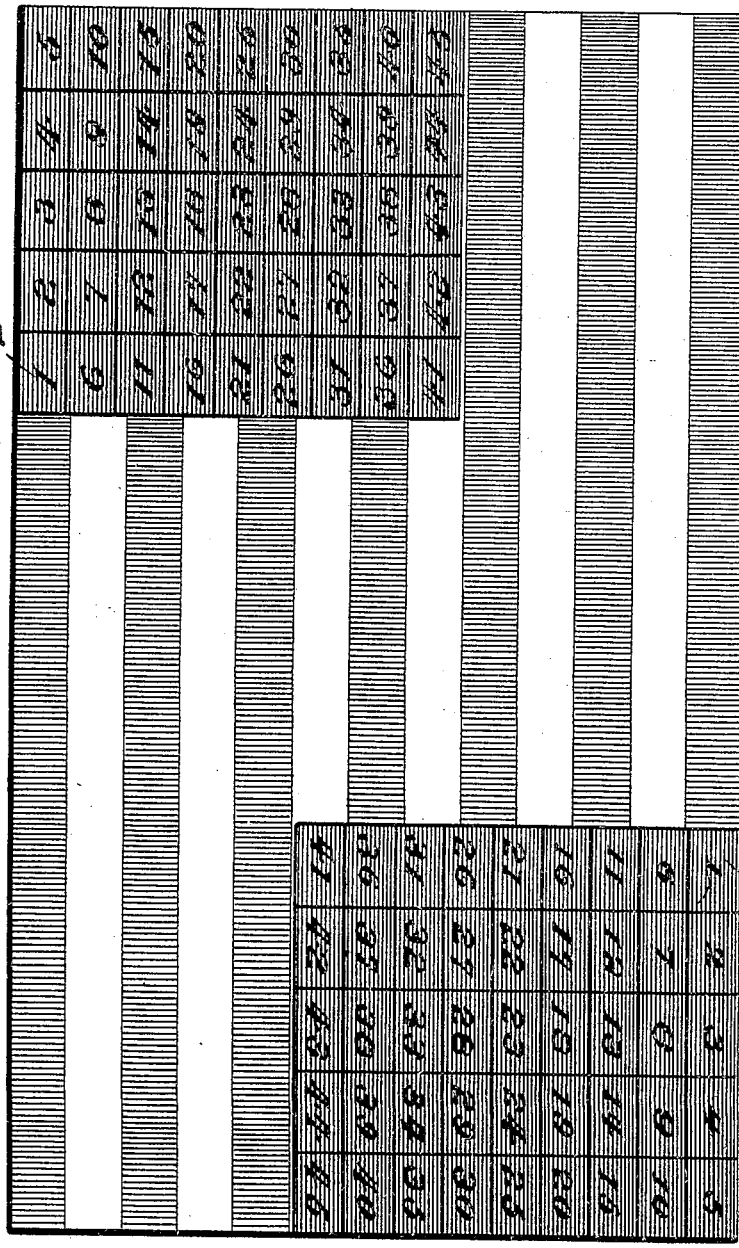
Figure 2:
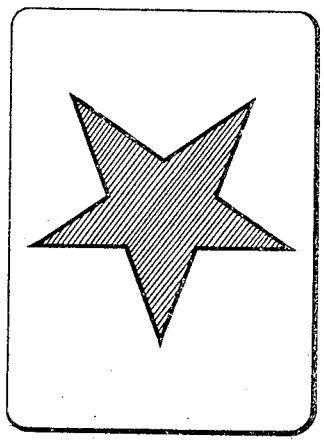
Figure 3:
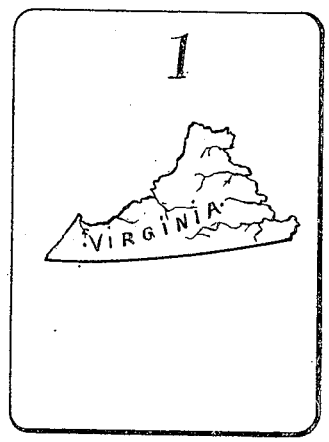
Figure 4:
Figure 5:
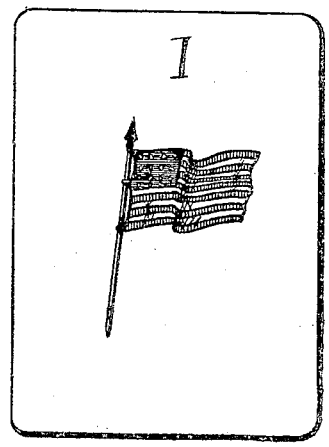

Figure 1 is a plan view of the preferred form of the board. Fig. 2 is a view showing the back of each card in the deck. Fig. 3 is a detail view of one of the State-cards—namely, one of those having a map thereon. Fig. 4 is a detail view of another State-card and, namely, one of those having the coat of arms of a State thereon. Fig. 5 is a detail view of one of the flag-cards.

Corresponding and like parts are referred to in the following description and indicated in all the views of the drawings by the same reference characters.

The game consists of a board 1 and a deck of cards. The board 1 is substantially the representation of the United States flag, being provided with a plurality of striped spaces 3, preferably of different color, and in diagonally opposite corners of the board, which is of approximately oblong form, are located star-fields 2. Star-fields 2 comprise a number of card-spaces, each being designated by consecutive numerals ranging from one to forty-five, in accordance with the number of spaces in the Union and the number of stars in the United States flag. The numerals in the star-fields 2 are opposite with reference to each other, so that the player upon one side of the board will have the numerals arranged so as to be readily read by him.

From the standpoint of interest the object of respective players is to fill the star-spaces of the flag upon the board with the proper cards as he takes them from the board in the play, each play running in tricks in the usual manner. The game is very instructive, since the players are familiarized with the order of admission of the States into the Union and also to some extent with some special feature of educational interest about the said States. The deck of cards used in connection with the board 1 is preferably composed of one hundred and two cards, which cards are divided in three sets. The backs of the cards are provided with stars, so that as the cards are placed in the star-spaces of the flag the stars of the cards at the close of the game will fill the star-spaces, thereby forming a complete flag. The three sets of cards comprised in the deck are as follows: twelve superior cards provided upon their face sides with data in the form of a flag, the same being the higher cards in relative value of the deck; forty-five cards provided upon their face sides with data in the form of the coat of arms of the respective States for which they stand. The remaining forty-five cards have their face sides provided with a map of the respective State which each of same represents and any other data of instructive import which it may be desirable to provide. The map and coat-of-arms cards are each additionally provided upon their face sides with numerals which are designed to indicate the relative value of each card in the play and also the position of the States in order of admission into the Union. The flag-cards also are numbered consecutively from "1" to "12", each of the State-cards in accordance with the above having numerals ranging from "1" to "45." For instance, Virginia being the first of the thirteen original colonies would be designated by the numeral "1." The State-cards, which consist of the map and coat-of-arms cards, are the cards which would be placed upon the star-spaces, designated 2 on the board 1, the numeral on the card corresponding, of course, with the numeral of the star-space on which same is placed at the end of a play. The cards with the maps must be used upon the star-spaces of one flag, and the other State-cards, those having the coat of arms thereon, are to be used in filling the star-spaces upon the other flag.

The preferred manner of playing the game is as follows: Each player selects the star-field upon which he is going to lay his card. He then designates which set of State-cards— either the map or coat-of-arms cards—with which he will endeavor to fill the star-spaces of his star-field, and he is restricted to these cards after the game has started. The cards of the deck are first shuffled preparatory to distribution to the players and are then dealt three to each player to be played to the board. Each person plays a card upon the board, and the one playing the highest card takes the trick and distributes those of the State-cards which are designed to fill the star-spaces of his flag to their proper positions. The flag-cards are the superior cards and will therefore take the State-cards in every instance, the value of the respective flag and State cards being determined by the numeral carried thereby. Thus a high map-card will take a low coat-of-arms card, and a flag-card of any value will be superior to a State-card of any value. Since the flag-cards cannot be distributed upon the star-spaces, they are placed in reserve after being played, and a player taking certain of his opponent's cards must also place these in reserve, since he is not permitted to place the same upon his star-spaces. Where two cards of the same relative value— namely, two State-cards having the same numbers thereon—are played, these are allowed to remain on the board until a player plays a higher card, which will take the trick. The reserve cards after the main deck has been dealt are then shuffled and played in the manner above described until one of the flags has the star-space thereon entirely filled by cards, which ends the game. The player who first fills the star-space of his flag is the winner of the game.

The game is of a simple nature and does not lack any interesting features. The descriptive data carried by the cards may of course be modified consistent with the general principle of the game, as hereinbefore set forth.

Having thus described the invention, what is claimed as new is—

1. A game-board having longitudinal stripes and diagonally-disposed fields subdivided into star-spaces, the whole representing two flags oppositely arranged and having stripes in common, the star-spaces of each field being numbered, and a pack of cards comprising two sets, each set consisting of and bearing a number corresponding with the respective star-spaces, the cards of one set bearing maps of the several States of the United States, the cards of the other set bearing coats of arms of said States, and each of the cards being provided on its back with a star to complete a flag when the cards of a set cover the respective star-spaces on a field of the game-board.

2. A game-board having longitudinal stripes and diagonally-disposed fields subdivided into star-spaces, the whole representing two flags oppositely arranged and having stripes in common, the star-spaces of each field being numbered, and a pack of cards comprising a set of superior cards bearing numbers and two sets of coats-of-arms and map cards, each of the latter sets comprising a number of cards corresponding to the star-spaces and similarly numbered and having each card provided upon its back with a star to complete a flag when the cards of a set cover the respective star-spaces on a field of the game-board.

In testimony whereof I affix my signature in presence of two witnesses.

ALTON H. RAGSDALE. [L. s.]

Witnesses:
D. L. BRANTLEY,
R. H. PLATT.